United States Patent
Chesneau

(10) Patent No.: US 8,836,174 B2
(45) Date of Patent: Sep. 16, 2014

(54) ENERGY SAVING SWITCH OF CONTINUOUSLY POWERED TRANSFORMERS

(76) Inventor: Suyanti Walujo Chesneau, Coppell, TX (US)

( * ) Notice: Subject to any disclaimer, the term of this patent is extended or adjusted under 35 U.S.C. 154(b) by 515 days.

(21) Appl. No.: 13/176,726

(22) Filed: Jul. 5, 2011

(65) Prior Publication Data
US 2012/0176213 A1    Jul. 12, 2012

Related U.S. Application Data

(63) Continuation-in-part of application No. 12/191,299, filed on Aug. 13, 2008, now abandoned.

(51) Int. Cl.
| | |
|---|---|
| H01H 47/00 | (2006.01) |
| H02J 9/00 | (2006.01) |
| H01R 31/06 | (2006.01) |
| H01R 13/70 | (2006.01) |
| H01R 29/00 | (2006.01) |
| H01F 27/42 | (2006.01) |
| H01R 13/66 | (2006.01) |
| H01F 27/34 | (2006.01) |

(52) U.S. Cl.
CPC .............. *H01F 27/42* (2013.01); *H02J 9/005* (2013.01); *H01R 31/065* (2013.01); *H01R 13/70* (2013.01); *H01R 29/00* (2013.01); *H01F 27/341* (2013.01); *H01R 13/6633* (2013.01)
USPC ........................................... 307/125

(58) Field of Classification Search
USPC ........................................... 307/125
See application file for complete search history.

(56) References Cited

U.S. PATENT DOCUMENTS

| | | | | |
|---|---|---|---|---|
| 3,716,719 | A * | 2/1973 | Angelery et al. | 307/17 |
| 6,339,314 | B1 * | 1/2002 | Bruning | 320/128 |
| 7,394,397 | B2 * | 7/2008 | Nguyen et al. | 340/693.3 |

* cited by examiner

*Primary Examiner* — Rexford Barnie
*Assistant Examiner* — Joseph Inge

(57) ABSTRACT

An additional miniature switch or jumper switch to be integrated within the power connector of any device that is using transformer but that does not need to be connected to it all the time. The energy saving switch will disconnect the primary winding of the transformer from the voltage source when the device does not need to be powered. The energy saving switch could also be integrated within the turn-on/off circuit of any devices that is using transformer continuously plugged to a voltage source to power the device that may be turned-off either with an interrupter (mechanical or even electronically with remote control). The energy saving switch operates when a transformer is not in use but still wasting energy while connected to a voltage supply. The energy saving switch will simply disconnect the primary winding of the transformer when no device is connected or when the device is turned-off.

20 Claims, 7 Drawing Sheets

ENERGY SAVING SWITCH OF CONTINUOUSLY POWERED TRANSFORMERS

PRIORITY CLAIM

The present application is a continuation-in-part application of U.S. patent application Ser. No. 12/191,299 filed on Aug. 13, 2008, now abandoned which is incorporated herein by reference.

TECHNICAL FIELD

The present application relates to chargers, power supplies, rechargeable-power supplies and, particularly, to transformers.

BACKGROUND

One day my husband and I were watching a TV show that was talking about ways to save energy. One of them is to unplug unused devices (any kind that use transformer) from the outlet when not in use. It turns out that these transformers consume power whenever they are plugged into the wall outlets, whether they are connected to a device or not. Since then we try to unplug them when not in use.

One day I told my husband: "there should be an easier way than always having to bend down and unplug these transformers from the outlets! Why don't they put a switch inside the connector that will shut down the transformer when we disconnect the device?". Hence, this idea begins.

The power consumption of an idle transformer is not large—on the order of 1 to 10 watts per transformer. But it does add up. Let's say that you have 10 transformers, and they consume 5 watts each. That means that 50 watts are being wasted constantly. For a year you will have wasted 50*24 hours 365 days=438 kilowatt-hour. A kilowatt-hour cost about 15 cents in my area, that means that I am wasting 438*0.15=$65.7 every year down the drain.

Going up to the scale of the US—there are roughly 100 million households in the United States. If each household wastes 50 watts on these transformers, that's a total of 5 billion watts. As a nation, that's more than $750,000 dollars wasted every hour, or $6,570,000,000 wasted every year! More than 6 billion dollars of energy are wasted in the US alone for a year.

Right now the only way to save energy when a transformer is not used is to disconnect the voltage source applied to its primary winding. Most of the time this means unplugging the device from the power outlet and this requires an effort from the user and his desire to save energy.

The shortcomings are that you need to have a person that is concerned about wasting energy and also that person is willing to unplug idle transformer each time would be advantageous to provide a saving of energy by simply disconnecting the primary winding of a transformer of any unused device.

It would also be advantageous to provide a way for users not to change their habits but still make them save energy that would have been wasted other wise.

It would further be advantageous to provide an integrated switch directly to the power connector or within the turn-off circuit of the device.

SUMMARY OF THE INVENTION

The problems and needs outlined above may be addressed by embodiments of the present invention. In accordance with one aspect of the present invention, there is provided an additional miniature switch or jumper switch to be integrated within the power connector of any device that is using a transformer but does not need to be connected to it all the time. The energy saving switch will disconnect the primary winding of the transformer from the voltage source (usually the outlet) when the device is not being powered.

In an embodiment, the energy saving switch could also be used with any device that is using transformer continuously plugged to a voltage source (any outlet for example) to power the device that may be turned-off either with an interrupter (mechanical or even electronically with remote control). In another embodiment, the energy saving switch would be integrated within the turn-on/off circuit of the device and will disconnect the primary winding of the transformer from the voltage source when the device is turned-off.

In another embodiment, the energy saving switch operates when a transformer is not in use but still wasting energy while connected to a voltage supply. The energy saving switch will simply disconnect the primary winding of the transformer when no device is connected or when the device is turned-off. This could be done even without notice from the user since he will be doing the same thing as before: unplugging the device from its power cord or turning it off.

The foregoing has outlined rather broadly features of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which.

For purposes of clarity and brevity, like elements and components will bear the same designations and numbering throughout the Figures.

DETAILED DESCRIPTION OF ILLUSTRATIVE EMBODIMENTS

Figure 1:
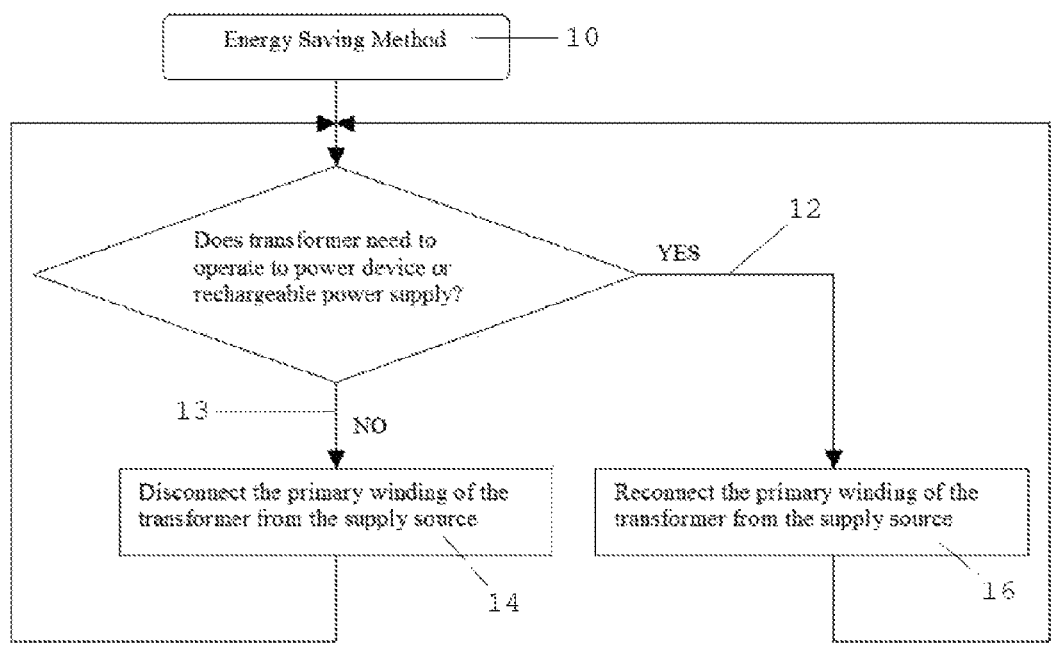
FIG. 1 is a general flow chart interpretation of the energy saving method for any device or rechargeable power supply using a transformer.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

FIG. 1 is a general flow chart interpretation of the Energy saving method 10 for any device or rechargeable power supply using a transformer 32. It is determined whenever to detect that power is needed 12 to power the device or rechargeable power supply either when the power cord of the device is connected to the adapter for recharge-circuit or transformed power supply 38, or when the device is switched on manually or with remote control with the transformer 32 built-in within the device. It is determined whenever to detect that power is not needed 13 to power the device or rechargeable power supply either when the power cord of the device is disconnected from the adapter for recharge-circuit or transformed power supply 38, or when the device is switched off manually or with remote control with the transformer 32 built-in within the device. If power is not needed to power the device or rechargeable power supply, a switch 42 will disconnect the primary winding of the transformer 14. If power is needed to power the device or rechargeable power supply, a switch 42 will reconnect the primary winding of the transformer 16.

Figure 2:
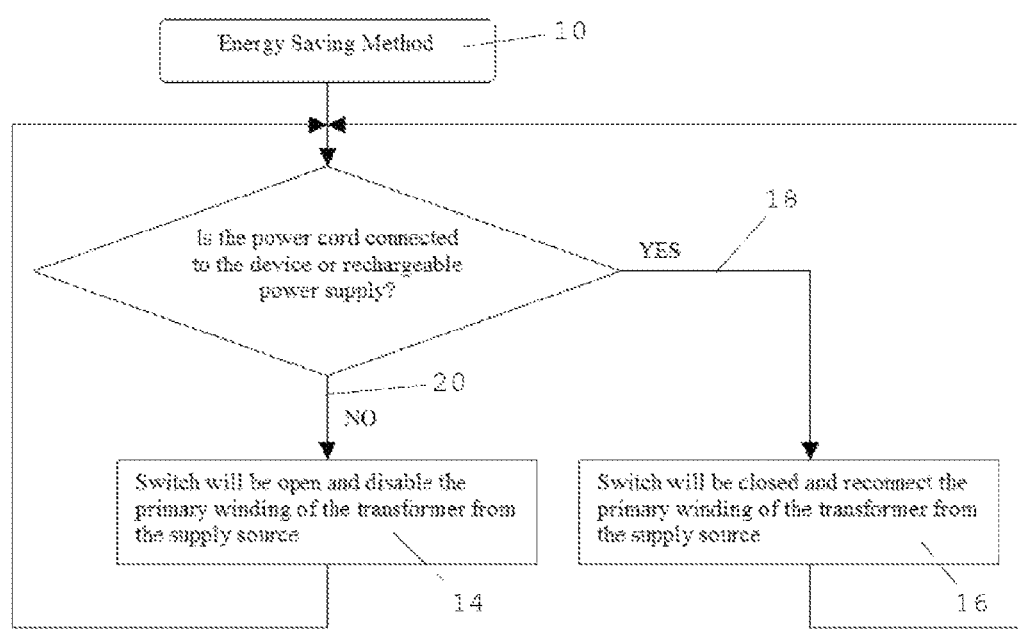
FIG. 2 is a flow chart interpretation of the energy saving method for any device or rechargeable power supply connected by a removable power cord.

FIG. 2 is a chart interpretation of the Energy saving method 10 for any device or rechargeable power supply connected by a removable power cord to an adapter for recharge-circuit or transformed power supply 38. It is determined whenever the power cord is connected 18 to the device or rechargeable power supply. If the power cord is disconnected 20 to the device or rechargeable power supply, a switch 42 will disconnect the primary winding of the transformer 14. If the power cord is connected 18 to the device or rechargeable power supply, a switch 42 will reconnect the primary winding of the transformer 16.

Figure 3:
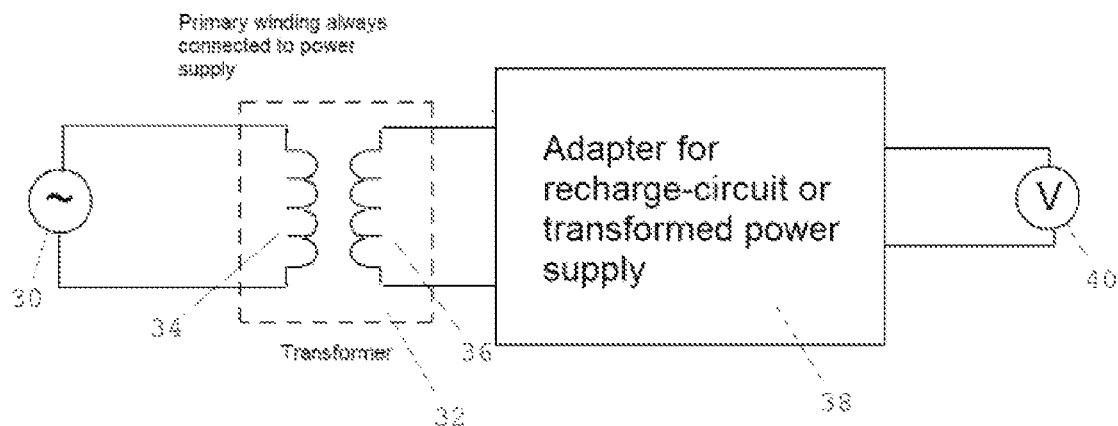
FIG. 3 is a schematic representation of an adapter or transformer that is always connected to a power supply.

FIG. 3 is a schematic representation of an adapter including a transformer 32 that is always connected to a power supply.

The transformer 32 is constituted of a primary winding 34 of the transformer 32 and the secondary winding 36 of the transformer 32. Here the power supply is an alternative power supply 30 that could be the alternative power supply 30 from the wall outlet. The primary winding 34 of the transformer 32 is always connected to the power supply so it will always consume energy even if the adapter for recharge-circuit or transformed power supply 38 is connected to a device or not. Here the adapter for recharge-circuit or transformed power supply 38 will generate a voltage transformed 40 to power a device.

Figure 4:
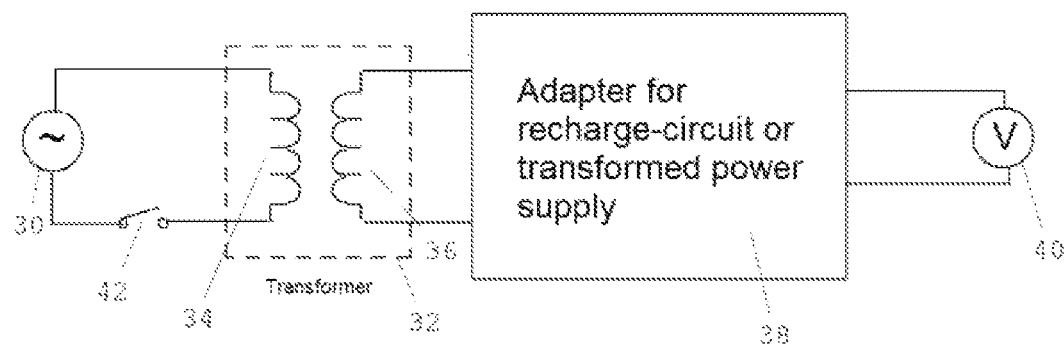
FIG. 4 is a schematic of an adapter or transformer that could be disabled with a switch placed in series within the primary winding of the transformer.

FIG. 4 is a schematic of an adapter or transformer 32 that could be disabled with a switch 42 placed in the primary winding 34 of the transformer 32. In this case, the primary winding 34 of the transformer 32 in series with a switch 42 is not always connected to the power supply and could be disabled with the switch 42 if the adapter for recharge-circuit or transformed power supply 38 is not connected to a device via the power cord or does not need to operate because it is turned-off either manually or with remote control. The switch 42 could be integrated directly inside the power connector if the device uses a power cord to connect the adapter for recharge-circuit or transformed power supply 38. The switch 42 could also be integrated directly within the turn-on/off circuit of the device when the transformer 32 is within the device itself (as discussed below regarding FIG. 8). If the device uses remote control to turn-on/off, an electronic switch 42 may be used to disconnect and reconnect the primary winding 34 of the transformer 32. Since the main power supply will be disabled, the electronic switch 42 may need to be powered by a small battery that could be rechargeable, for example.

Figure 5:
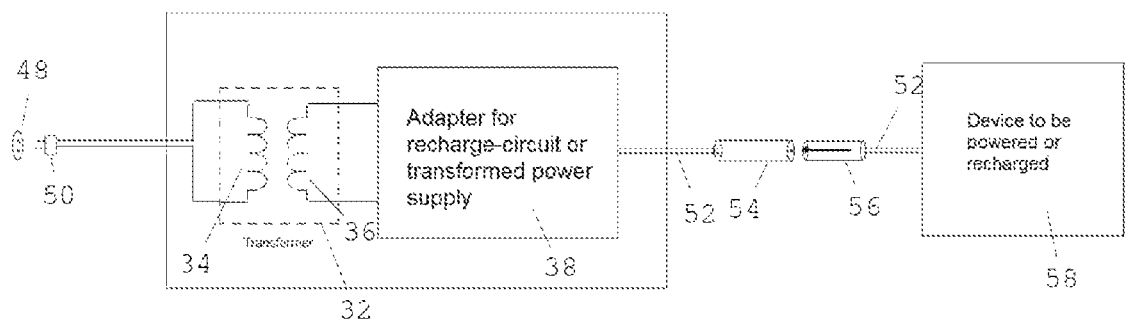
FIG. 5 is a schematic of a typical rechargeable device or device that needs to be powered using an adapter that connects rechargeable-circuit to a power-supply via a power connectors.

FIG. 5 is a schematic of a typical rechargeable device or device to be powered or recharged 58 using an adapter that connects rechargeable-circuit to a power-supply via power connectors (female power connector 54 and male power connector 56, or vice versa). Usually one female power connector 54 and one male power connector 56 are used to connect the adapter for recharge-circuit or transformed power supply 38 to the device to be powered or recharged 58. The primary winding 34 of the transformer 32 is always connected to the wall outlet 48 via a power supply plug 50. Both the female power connector 54 and the male power connector 56 will need 2-wires conductor cable 52 to power or recharge the device to be powered or recharged 58.

Figure 6A:
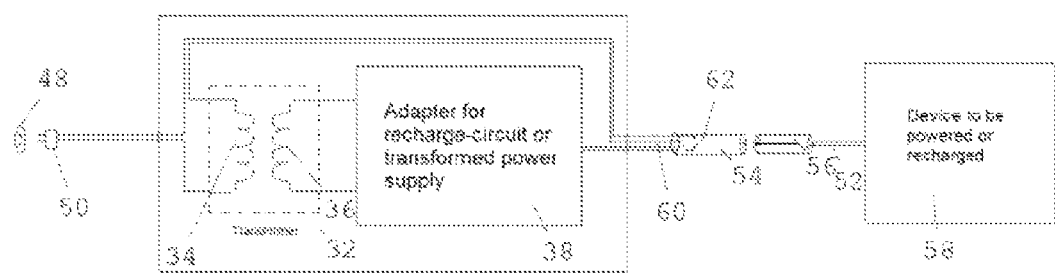
FIG. 6A is a schematic of a power-saving technique of a rechargeable device or device that needs to be powered using an adapter that connects rechargeable-circuit to a power-supply via power connectors which contained a micro-switch or detect-switch within the female power connector.
Figure 6B:
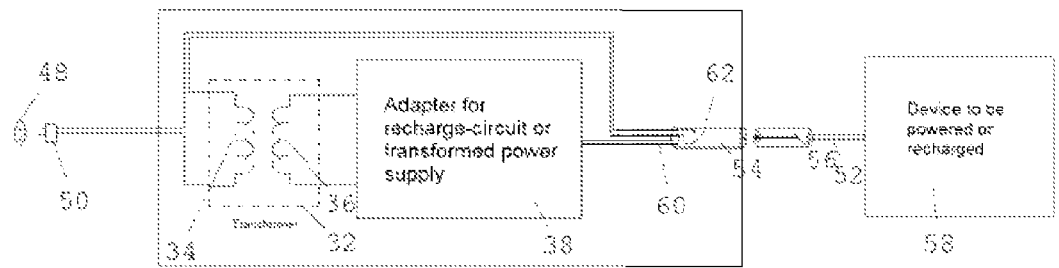
FIG. 6B is a schematic of a power-saving technique of a rechargeable device or device that needs to be powered using an adapter that connects rechargeable-circuit to a power-supply via power connectors which contained a micro-switch or detect-switch within the female power connector, which are in a same housing as the transformer.

FIG. 6A is a schematic of a power-saving technique of a rechargeable device or device that needs to be powered using an adapter for recharge-circuit or transformed power supply 38 that connects device to be powered or recharged 58 to a power supply via power connectors which contained a micro-switch or detect-switch within the female power connector 62. When the device to be powered or recharged 58 is connected via power connectors to the adapter, the detect-switch within the female power connector 62 will be closed and will reconnect the primary winding 34 of the transformer 32, and the device will be powered. However when the device to be powered or recharged 58 is disconnected from the power connectors, the detect-switch within the female power connector 62 will be opened and will disconnect the primary winding 34 of the transformer 32 and doing so will save energy when the device does not need to be powered or recharged. The female power connector 54 in this example embodiment uses 4-wires conductor cable 60 instead of a 2-wires conductor cable 52 (compare to FIG. 5) to be able to disconnect the primary winding 34 of the transformer 32. The female power connector 54 of this embodiment may be a female power connector with two terminals used as usual to connect the transformed power supply, while two additional wires extend from the female connector 62 used to connect the switch 62 to the primary winding 34 of the transformer 32. To clarify what is shown in FIG. 6A, the switch 62 is activated by a mechanical action without the need for active circuitry. As discussed in other portions of this specification, FIG. 6B shows a variation on the embodiment of FIG. 6A, in which the female connector 54 and the switch 62 are in a same housing as that of the transformer 32, rather than having wires 60 extending from the housing.

Figure 7A:
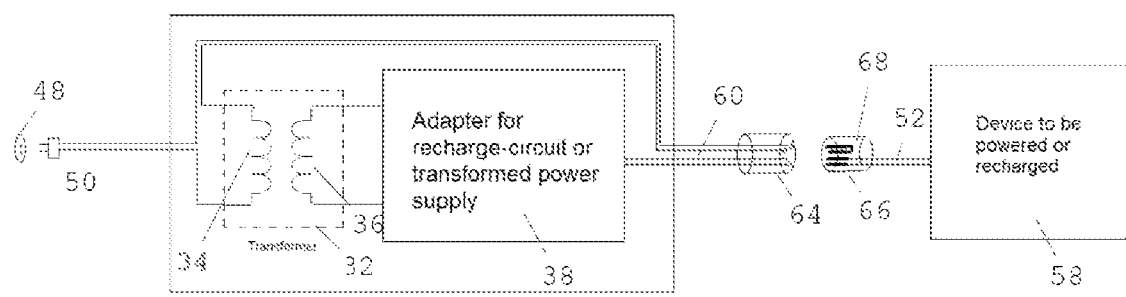
FIG. 7A is a schematic of a power-saving technique of a rechargeable device or device that needs to be powered using an adapter that connects rechargeable-circuit to a power-supply via power connectors which contained a jumper-switch within the male power connector.
Figure 7B:
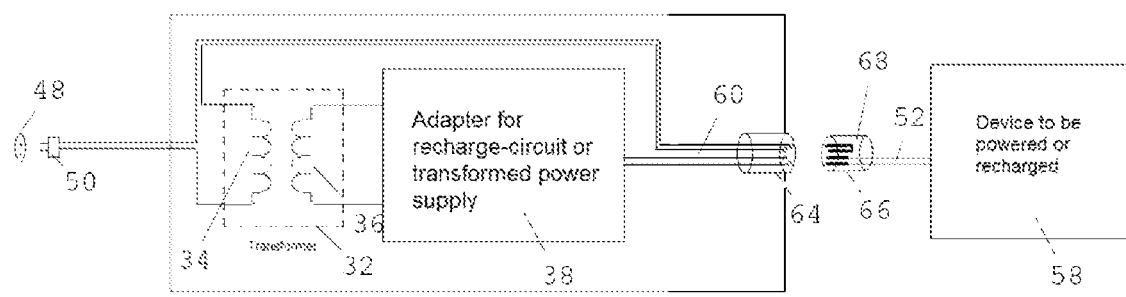
FIG. 7B is a schematic of a power-saving technique of a rechargeable device or device that needs to be powered using an adapter that connects rechargeable-circuit to a power-supply via power connectors which contained a jumper-switch within the male power connector, which are in a same housing as the transformer.

FIG. 7A is a schematic of a power-saving technique of a rechargeable device or device that needs to be powered using an adapter for recharge-circuit or transformed power supply 38 that connects device to be powered or recharged 58 to a power-supply via a power connector which contains a jumper-switch within the male power connector 68. When the device to be powered or recharged 58 is connected via power connectors to the adapter, the jumper-switch within the male power connector 68 will reconnect the primary winding 34 of the transformer 32, and the device will be powered. However when the device to be powered or recharged 58 is disconnected from the power connectors, the jumper-switch within the male power connector 68 will disconnect the primary winding 34 of the transformer 32, and by doing so will save energy since the primary winding 34 of the transformer 32 will be disconnected from the power supply. The female power connector in this embodiment has a 4-wires conductor cable 60 instead of a 2-wires conductor cable 52 (compare to FIG. 5) to allow the primary winding 34 of the transformer 32 to be disconnected from the power supply. The female power connector here has four terminals 64. The male power connect will also have four terminals, but two of them will be shorted together to act as a jumper-switch within the male power connector 68. The male power connector 68 here is a male power connector with four terminals 66. As discussed in other portions of this specification, FIG. 7B shows a variation on the embodiment of FIG. 7A, in which the female connector is in a same housing as that of the transformer 32, rather than having wires 60 extending from the housing.

Figure 8:
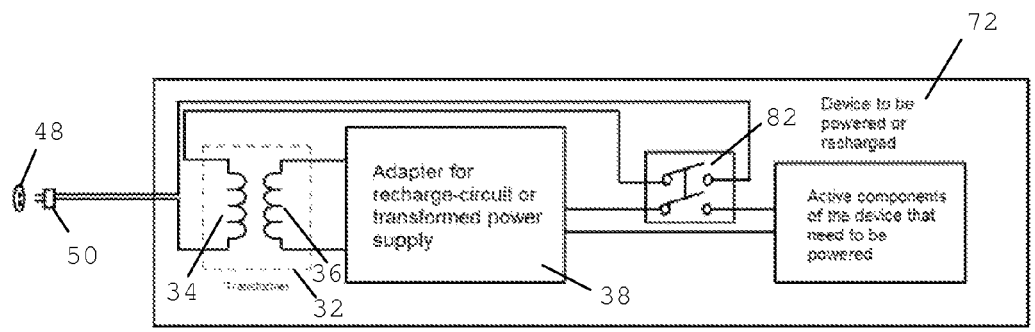
FIG. 8 is a schematic of a power-saving technique of a device that needs to be powered or recharged using an adapter for recharge-circuit or transformed power supply which includes a switch coupled to the on/off switch of the device.

As discussed in other portions of this specification, FIG. 8 provides illustration as a schematic of a power-saving technique of a device that needs to be powered or recharged using an adapter for recharge-circuit or transformed power supply 38 which includes a switch 82 coupled to the on/off switch of the device 72. When the device 72 to be powered or recharged is turned on, the switch 82 coupled to the on/off switch of the device 72 will be closed and will reconnect the primary winding of the transformer 32 and the device 72 will be powered. However, when the device 72 to be powered or recharged is turned off, the switch 82 coupled to the on/off switch of the device 72 will be opened and will disconnect the primary winding 34 of the transformer 32. Thus, in an embodiment, the switch 82 that connects and disconnects the primary winding 34 of the transformer 32, is mechanically coupled to the on/off switch for the device 72 so that the primary winding 34 can be connected/disconnected without active circuitry automatically when the user engages/disengages the on/off switch for the device 72. This embodiment, and the other embodiments described herein, each provides a way to connect/disconnect the primary winding 34 of the transformer 32 without the user needing to take an extra step or affirmative step to do so. It simply happens when the user turns off the device (e.g., FIG. 8) and/or when the user disconnects the device from the power adapter brick (e.g., FIGS. 7A and 7B), for example, thus saving energy.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

What is claimed is:

1. An energy-saving power supply system comprising:
   a transformer including a primary winding and a secondary winding;
   a first plug connector for electrically coupling the transformer to a power source, the first plug connector including a first plug terminal and a second plug terminal, the first plug terminal being electrically coupled to a first end of the primary winding; and
   a second plug connector including a first plug portion and a second plug portion, the first plug portion having a shape that mates with the second plug portion,
      the first plug portion including at least one power terminal configured for electrically coupling the secondary winding of the transformer to a device, a first jumper switch terminal, and a second jumper switch terminal, the first jumper switch terminal being electrically coupled to the second plug terminal of the first plug connector,
      the second jumper switch terminal being electrically coupled to a second end of the primary winding of the transformer, and
      the second plug portion including a third jumper switch terminal and a fourth jumper switch terminal, the third jumper switch terminal being electrically coupled to the fourth jumper switch terminal for forming a closed jumper switch when the first plug portion is mated with the second plug portion of the second plug such that, without the need for active circuitry, the closed jumper switch electrically connects the power source to the primary winding of the transformer by a mechanical action of mating the first plug portion to the second plug portion.

2. The energy-saving power supply system of claim 1, wherein the first plug terminal is directly electrically connected to a first end of the primary winding,
   wherein the first jumper switch terminal is directly electrically connected to the second plug terminal of the first plug connector, and
   wherein the second jumper switch terminal is directly electrically connected to the second end of the primary winding of the transformer.

3. The energy-saving power supply system of claim 1, wherein the first plug terminal is directly electrically connected to a first end of the primary winding.

4. The energy-saving power supply system of claim 1, wherein the first jumper switch terminal is directly electrically connected to the second plug terminal of the first plug connector.

5. The energy-saving power supply system of claim 1, wherein the second jumper switch terminal is directly electrically connected to the second end of the primary winding of the transformer.

6. The energy-saving power supply system of claim 1, wherein the first plug portion of the second plug connector is located in a same housing as the transformer.

7. The energy-saving power supply system of claim 1, wherein the first plug connector is located in a same housing as the transformer.

8. The energy-saving power supply system of claim 1, wherein both the first plug connector and the first plug portion of the second plug connector are located in a same housing as the transformer.

9. An energy-saving power supply system comprising:
a transformer including a primary winding and a secondary winding;
a first plug connector for electrically coupling the transformer to a power source, the first plug connector including a first plug terminal and a second plug terminal, the first plug terminal being electrically coupled to a first end of the primary winding; and
a second plug connector including a first plug portion and a second plug portion, the first plug portion having a shape that mates with the second plug portion,
the first plug portion including at least one power terminal configured for electrically coupling the secondary winding of the transformer to a device, a first jumper switch terminal, and a second jumper switch terminal, the first jumper switch terminal being electrically coupled to the second plug terminal of the first plug connector,
the second jumper switch terminal being electrically coupled to a second end of the primary winding of the transformer, and
the second plug portion including a third jumper switch terminal and a fourth jumper switch terminal, the third jumper switch terminal being electrically coupled to the fourth jumper switch terminal for forming a closed jumper switch when the first plug portion is mated with the second plug portion of the second plug such that, without the need for active circuitry, the closed jumper switch electrically connects the power source to the primary winding of the transformer by a mechanical action of mating the first plug portion to the second plug portion,
wherein both the first plug connector and the first plug portion of the second plug connector are located in a same housing as the transformer.

10. The energy-saving power supply system of claim 9, wherein the first plug terminal is directly electrically connected to a first end of the primary winding,
wherein the first jumper switch terminal is directly electrically connected to the second plug terminal of the first plug connector, and
wherein the second jumper switch terminal is directly electrically connected to the second end of the primary winding of the transformer.

11. The energy-saving power supply system of claim 9, wherein the first plug terminal is directly electrically connected to a first end of the primary winding.

12. The energy-saving power supply system of claim 9, wherein the first jumper switch terminal is directly electrically connected to the second plug terminal of the first plug connector.

13. The energy-saving power supply system of claim 9, wherein the second jumper switch terminal is directly electrically connected to the second end of the primary winding of the transformer.

14. A method of saving energy in a power supply system that includes a transformer, the method comprising:
without active circuitry, mechanically disconnecting a primary winding of the transformer from a power source when at least one of the following two conditions are met: (i) a first jumper switch terminal of a second plug connector is electrically decoupled from a third jumper switch terminal of the second plug connector, and/or (ii) a second jumper switch terminal of the second plug connector is electrically decoupled from a fourth jumper switch terminal of the second plug connector;
wherein a first plug connector includes a first plug terminal and a second plug terminal, the first plug terminal being electrically coupled to a first end of the primary winding,
wherein the first jumper switch terminal is electrically coupled to the second plug terminal of the first plug connector,
wherein the second jumper switch terminal is electrically coupled to a second end of the primary winding of the transformer,
wherein the second plug connector includes a first plug portion and a second plug portion, the first plug portion having a shape that mates with the second plug portion,
wherein the first plug portion of the second plug connector includes at least one power terminal configured for electrically coupling a secondary winding of the transformer to a device,
wherein the first plug portion of the second plug connector further includes the first jumper switch terminal and the second jumper switch terminal,
wherein the second plug portion includes the third jumper switch terminal and the fourth jumper switch terminal, and
wherein the third jumper switch terminal is electrically coupled to the fourth jumper switch terminal for forming a closed jumper switch when the first plug portion is mated with the second plug portion of the second plug.

15. The method of claim 14 further comprising: without active circuitry, connecting the primary winding of the transformer to the power source when at least the following three conditions are met, in any order: (i) the first plug connector is electrically coupled to a power source connector, (ii) the first jumper switch terminal of a second plug connector is electrically coupled to the third jumper switch terminal of the second plug connector, and (iii) the second jumper switch terminal of the second plug connector is electrically coupled to the fourth jumper switch terminal of the second plug connector.

16. The method of claim 14, wherein the first plug terminal is directly electrically connected to a first end of the primary winding.

17. The method of claim 14, wherein the first jumper switch terminal is directly electrically connected to the second plug terminal of the first plug connector.

18. The method of claim 14, wherein the second jumper switch terminal is directly electrically connected to the second end of the primary winding of the transformer.

19. The method of claim 14, wherein the first plug portion of the second plug connector is located in a same housing as the transformer.

20. The method of claim 14, wherein the first plug connector is located in a same housing as the transformer.

* * * * *